United States Patent [19]
Tenhover et al.

[11] Patent Number: 5,616,426
[45] Date of Patent: Apr. 1, 1997

[54] CERAMIC SUBSTRATE WITH SILICON CARBIDE SMOOTHING LAYER

[75] Inventors: Michael A. Tenhover, East Amherst; Irving B. Ruppel, Kenmore, both of N.Y.

[73] Assignee: The Carborundum Company, Worcester, Mass.

[21] Appl. No.: 536,716

[22] Filed: Sep. 29, 1995

Related U.S. Application Data

[62] Division of Ser. No. 288,386, Aug. 10, 1994, Pat. No. 5,480,695.

[51] Int. Cl.$^6$ ........................................... B32B 9/00
[52] U.S. Cl. ........................... 428/688; 428/408; 428/704; 427/577
[58] Field of Search ........................... 428/688, 689, 428/701, 702, 408, 704; 430/5; 427/577

[56] References Cited

U.S. PATENT DOCUMENTS

| | | |
|---|---|---|
| 3,681,225 | 8/1972 | Genma et al. . |
| 3,716,759 | 2/1973 | Scace et al. . |
| 4,069,360 | 1/1978 | Yanagisawa et al. . |
| 4,179,299 | 12/1979 | Coppola et al. . |
| 4,312,954 | 1/1982 | Coppola et al. . |
| 4,376,963 | 3/1983 | Knoop et al. . |
| 4,411,963 | 10/1983 | Aine . |
| 4,525,461 | 6/1985 | Boecker et al. . |
| 4,528,212 | 7/1985 | Cairns et al. . |
| 4,598,017 | 7/1986 | Bayer et al. . |
| 4,660,114 | 4/1987 | Yamakawa et al. . |
| 4,661,420 | 4/1987 | Nakamura et al. . |
| 4,738,885 | 4/1988 | Matsumoto . |
| 4,759,836 | 7/1988 | Hill et al. . |
| 4,833,020 | 5/1989 | Shiroishi et al. . |
| 4,840,844 | 6/1989 | Futamoto et al. . |
| 4,859,638 | 8/1989 | Wada et al. . |
| 4,877,690 | 10/1989 | Glocker et al. . |
| 4,953,051 | 8/1990 | Wada et al. . |
| 4,994,330 | 2/1991 | Steininger . |
| 5,098,541 | 3/1992 | Funkenbusch . |
| 5,162,133 | 11/1992 | Bartha ........................... 427/577 |
| 5,165,981 | 11/1992 | Tadashi et al. . |
| 5,166,962 | 11/1992 | Murooha ........................... 430/5 |
| 5,190,631 | 3/1993 | Windischmann et al. . |
| 5,200,249 | 4/1993 | Dolbert . |
| 5,225,951 | 7/1993 | Kira et al. . |
| 5,234,608 | 8/1993 | Kashida ........................... 430/5 |
| 5,326,607 | 7/1994 | Muramatsu et al. . |
| 5,326,637 | 7/1994 | Nasu et al. . |

FOREIGN PATENT DOCUMENTS

| | | |
|---|---|---|
| 0144055A2 | 6/1985 | European Pat. Off. . |
| 0410575A2 | 1/1991 | European Pat. Off. . |
| 0231672B1 | 6/1992 | European Pat. Off. . |
| 60-229224 | 11/1985 | Japan . |

OTHER PUBLICATIONS

D. Rose "Stretching for 10 Gigabits Offers New Opportunities", *Electronic Materials Reports*, Nov. 1992 at pp. 2–6.
J. Bond, "The Incredible Shrinking Disk Drive", *Solid State Technology*, Sep. 1993 at pp. 39–45.
R. Nass, "Hard–Disk Drives Pack More Data Into Less Space" *Electronic Design*, May 3, 1993, pp. 73–83.
Kirk–Othmer Encyclopedia of Chemical Technology, vol. 14, pp. 686–707.

*Primary Examiner*—Patrick Ryan
*Assistant Examiner*—Patrick Jewik
*Attorney, Agent, or Firm*—Richard L. Hansen; Tom Dimauro

[57] ABSTRACT

Substrates are disclosed having an ultra-smooth surface finish thereon rendering them useful in making high density magnetic storage components, such as a computer hard disk or thin-film head which can read and/or write data on such disks. The substrates are comprised of a non-oxide ceramic base which is coated with a smoothing layer comprised of amorphous, non-stoichiometric silicon carbide corresponding to the formula $SiC_x$, wherein x is the molar ratio of carbon to silicon and is greater than 1. Also disclosed are processes for making the substrates and components.

7 Claims, 2 Drawing Sheets

CERAMIC SUBSTRATE WITH SILICON CARBIDE SMOOTHING LAYER

This is a divisional of application Ser. No. 08/288,386 filed on Aug. 10, 1994 now U.S. Pat. No. 5,480,695.

FIELD OF THE INVENTION

This invention concerns ceramic substrates suitable for use in components employed for magnetic data storage, such as a computer hard disk or a read/write head. The invention also concerns methods for making the substrates and components.

BACKGROUND OF THE INVENTION

Computers widely used today are capable of storing and rapidly manipulating large amounts of data. Typically, such data is stored on some type of magnetic recording medium consisting of a thin magnetic film supported by a substrate. A relatively simple example of such media are magnetic tapes wherein the magnetic film is placed on a flexible polymer film.

The introduction of small computers in recent years for individual users, the so-called "personal computer" or "PC", has generated a need for other types of magnetic data storage needs. Such computers can employ a so-called "floppy disk" for data storage where the magnetic film is placed on a small circular disk substrate that is somewhat rigid, but still flexible. Typically, these computers also employ, as an important component thereof, a so-called "hard disk" drive wherein a relatively large amount of data can be stored on one or more magnetic disks, each of which comprise a magnetic film supported by a rigid, non-flexible substrate.

Research efforts have recently focused on improving magnetic data storage technology by trying to reduce the size of the hard disk (to decrease computer size) and, at the same time, attempting to increase the amount of data that can be stored on the disk. Information stored on a magnetic medium is read by the computer using a recording (read-write) head and/or a read-only head which can "float", i.e., pass, directly over the surface of the magnetic medium and thereby "read" information stored magnetically thereon. Information stored on the medium is measured in terms of bits of data per unit area, typically referred to as areal density.

Factors which affect areal density are the thickness, coercivity, magnetic axis orientation, and crystalline texture of the magnetic film, as well as the height at which the recording head floats over the medium. In general, it is advantageous to have the head float as close as possible to the surface of the medium and at a constant height, preferably as low as about 50 Angstroms (Å), since this helps maximize useful storage density.

Substrates conventionally used in hard disk media have been based on an aluminum or aluminum-alloy core which is coated with a thin electrodeposited nickel-phosphorous (NiP) layer and finally a thin magnetic metal film, typically of a cobalt-chromium alloy. An example of such media is described in U.S. Pat. No. 4,069,360. While such substrates have been successfully used in the past, they are limited in the amount of information that can be stored due to characteristics of the aluminum-NiP substrate.

For example, one problem with such conventional substrates concerns a tendency for aluminum-based disks to deform, i.e., warp, when subjected to the high temperatures necessary to form a suitable magnetic film on the disk. The NiP coating also has a relatively low melting point which similarly impairs the flatness of the intermediate substrate when it is heated in subsequent processing steps. Due to these problems, manufacturing processes presently used to make media based on an aluminum-NiP substrate yield a significant number of defective products that cannot be sold commercially and are typically discarded. The high rejection rate appreciably adds to the cost for such products.

Aluminum and aluminum alloys can be relatively soft materials and, therefore, the surface of these substrates is susceptible to damage during subsequent processing steps and also from improper handling. Further, due to the crystal structure of aluminum, it is difficult to obtain a smooth, mirror-like finish and thereby minimize surface irregularities thereon, which can be thought of simplistically as "peaks" or "valleys". Aluminum or aluminum alloys also can, following high temperature exposure, form intermetallic inclusions which further roughen the surface. These surface irregularities are undesirable, since the magnetic film deposited on the substrate is typically on the order of only about a few hundred angstroms (Å) thick or less and, therefore, any underlying substrate surface irregularities may adversely effect the magnetic axis orientation and texture of the overlying magnetic layer.

The above-described problems with conventional aluminum-based substrates all interfere with the need to have the head float as close as possible to the disk surface. If the surface is uneven due to warpage, or alternatively, has a significant amount of surface peaks and valleys, then the substrate will have a high average surface roughness (Ra). Since the head floats at a height related to this average surface roughness, these problems can limit the amount of information which can be written onto and read from the substrate.

Due to the limitations with conventional aluminum-based substrates, a number of materials have been recently proposed as replacements, such as glass, glass-coated alumina, carbon, silicon nitride and silicon carbide. Glass suffers from a similar strength and rigidity problem, since it tends to also deform when exposed to high temperature. Silicon nitride and silicon carbide have much better strength, toughness, and chemical resistance, especially at high temperatures, but being ceramics they are inherently porous to some extent and therefore, by themselves, have an undesirable surface roughness associated with them. Carbon is disadvantageous due to its porosity, low elastic modulus, and difficulties involved with bonding thin layers of materials on the surface thereof.

Others have attempted to employ silicon carbide as a substrate for magnetic storage disks. Japanese patent publication JP 60-229224 discloses a magnetic disc substrate consisting of silicon carbide which is coated with a thin sputtered film of $Al_2O_3$, $SiO_2$ and/or $Si_3N_4$. While the inventors of this substrate purport to provide a poreless and strainless coating on the silicon carbide substrate, these coatings are difficult to form due to a low sputtering rate and they are relatively expensive to produce.

U.S. Pat. No. 4,598,017 discloses a composite magnetic disk which incorporates a reaction-bonded, silicon carbide substrate. The silicon carbide substrate is initially treated in a siliciding step wherein silicon is said to be deposited into pores on the surface of the silicon carbide and eventually a silicon layer is formed. Thereafter, the surface of the silicon is polished to a final surface roughness of 25 nm (250 Å) Ra, and if this is not possible, the siliciding and polishing steps are repeated. A magnetic layer is formed on the silicon and the substrate is thereafter bonded to an annular, polymeric core.

While the inventors of this composite disk purport to improve the surface finish of reaction-bonded silicon carbide, a surface roughness of 25 nm Ra is not sufficiently smooth to allow use of the low head heights and extremely thin magnetic layers necessary for the high density data storage needs presently of interest to industry.

In addition to media, a smooth surface on the corresponding head would be desirable to minimize the height at which the head floats over the surface of the media. Heads currently employed in storage devices are based on a substrate of alumina and titanium carbide. On this substrate, inductive and/or magnetoresistive circuits or coils are formed by known photolithographic methods and encapsulated with a thin film of alumina. Examples of such heads are described in U.S. Pat. Nos. 4,660,114 and 5,165,981 and the manufacture thereof is also described by J. Bond in "The Incredible Shrinking Disk Drive", *Solid State Technology* (September 1993) at pages 39–45.

Since alumina is relatively non-conductive, the encapsulating film previously described is typically formed by RF sputtering. A major disadvantage with RF sputtering concerns the extremely long period of time required to deposit a layer of alumina sufficiently thick for such heads, in some cases as much as 30 hours. This adds significantly to the cost of the storage devices. Also, as mentioned by Bond, the aluminum-titanium carbide base material is difficult to machine.

As a result, it would be desirable to develop an alternative substrate which has sufficient strength, high thermal conductivity, chemical attack resistance, sufficient toughness, and a relatively low coefficient of thermal expansion under conditions in which such substrates are subjected to during manufacture of magnetic storage components and their subsequent use. It is also desirable to develop a substrate which can be easier to manufacture and polish to a very fine surface finish. Such substrates could be used to produce components which allow a read/write head to float at a very low height so as to maximize areal density.

SUMMARY OF THE INVENTION

The above-described objects and advantages are attained according to the invention described hereinafter. In one aspect, the invention concerns a substrate comprising a non-oxide ceramic base with a substantially amorphous smoothing layer of silicon carbide thereon. The non-oxide ceramic has a density of at least about 90 percent of theoretical density and a coefficient of thermal expansion of from about 2 to about 7 ppm/°C. The smoothing layer is comprised of amorphous silicon carbide corresponding to the formula $SiC_x$ wherein x is the molar ratio of carbon to silicon and is greater than 1, preferably from about 1.1 to less than about 1.45. The smoothing layer has an inner surface contacting at least one surface of the ceramic base and an outer surface with a surface roughness of about 100 Å Ra or less, preferably less than about 25 Å Ra.

In another aspect, the invention concerns a magnetic storage medium comprising:

a non-oxide ceramic base having a density of at least about 90 percent of theoretical density and coefficient of thermal expansion of from about 2 to about 7 ppm/°C.;

a substantially amorphous smoothing layer comprised of the amorphous, non-stoichiometric silicon carbide composition previously described and having an inner surface contacting at least one surface of the ceramic base and an outer surface with a surface roughness of about 100 Å Ra or less; and a magnetic layer capable of storing data and having an inner surface and an outer surface, the magnetic layer being disposed over the smoothing layer.

In another aspect, the invention concerns a thin-film head having a substrate comprised of a non-oxide ceramic base with a substantially amorphous smoothing layer of silicon carbide thereon. The non-oxide ceramic has a density of at least about 90 percent of theoretical density and a coefficient of thermal expansion of from about 2 to about 7 ppm/°C. The smoothing layer is comprised of the silicon carbide composition previously described. The smoothing layer has an inner surface contacting at least one surface of the ceramic base and an outer surface with a surface roughness of about 100 Å Ra or less, preferably less than about 25 Å Ra.

The invention also concerns a process for preparing a substrate adapted for use in magnetic data storage components. The process comprises the steps of:

providing a non-oxide ceramic base substrate having a density of at least about 90 percent of theoretical density and a coefficient of thermal expansion of from about 2 to about 7 ppm/°C.;

coating at least one surface of the base substrate with a smoothing layer comprised of an amorphous, non-stoichiometric silicon carbide corresponding to the formula $SiC_x$ wherein x is the molar ratio of carbon to silicon and is greater than 1; and polishing the smoothing layer to a surface roughness of less than about 100 Å Ra.

DETAILED DESCRIPTION

The substrate of the invention may take any shape which is adapted for use in making a component for magnetic data storage systems, such as a hard disk storage medium or thin-film head.

Figure 1A:
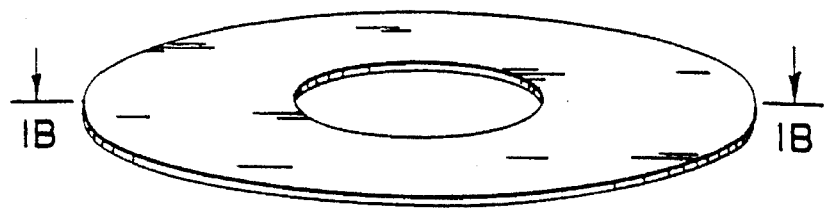
FIG. 1A is a perspective view of an embodiment of a magnetic storage medium in the shape of a flat, annular disk.
Figure 1B:
FIG. 1B is a cross-sectional view of the disk shown in FIG. 1A.

Generally, magnetic storage media currently being manufactured by industry are in the shape of a flat, annular disk as illustrated generally by FIGS. 1A and B herein. However, the substrate according to the invention, as well as a magnetic storage medium comprising the substrate, may also be in the form of a plate, hollow drum, or cylinder.

Figure 2:
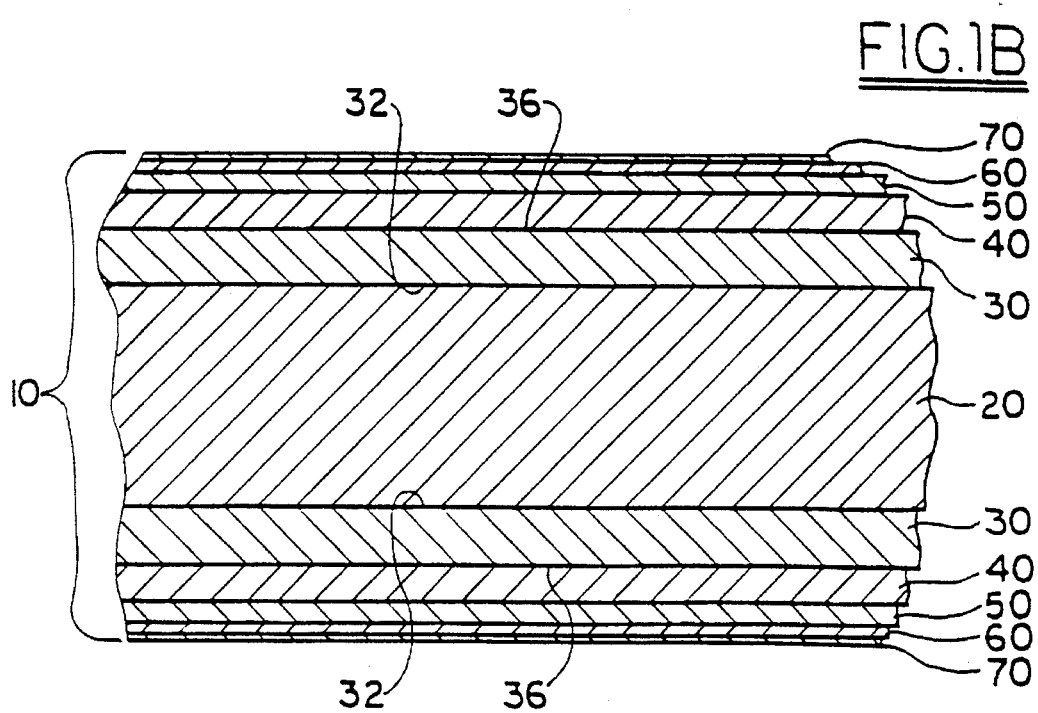
FIG. 2 is an enlarged section view of an embodiment of a magnetic storage medium according to the invention.

FIG. 2 shows an enlarged, cross-sectional view of an embodiment of a magnetic storage medium. The magnetic storage medium 10 (generally) is comprised of a non-oxide ceramic base 20 which is coated, on at least one surface thereof, with a smoothing layer 30. The smoothing layer 30 has an inner surface 32 and an outer surface 36, with the inner surface being in contact with the non-oxide ceramic base. In preferred embodiments, the magnetic storage medium has an annular disk shape with two flat major surfaces, such as the shape shown in FIGS. 1A and B, with the smoothing layer 30 (and other operative layers described hereinafter) being preferably coated on both of the flat surfaces.

Disposed on top of the smoothing layer 30 is a magnetic layer 50 which is of a material capable of magnetically storing data thereon. An optional transition layer 40 may be disposed such that it lies between the smoothing layer 30 and the magnetic layer 50. The transition layer is believed to promote bonding of the magnetic layer to the smoothing layer and, in some cases, may hinder mass transport from either the smoothing layer 30 or non-oxide ceramic base 20 to the magnetic layer 50. On top of the magnetic layer may be at least one optional protective layer, which for purposes of illustration, is shown in FIG. 2 as an carbon layer 60 and an overlying lubricant layer 70.

The above-described elements of a magnetic storage medium according to the invention are described in more detail hereinafter.

The non-oxide ceramic base may be of any non-oxide ceramic which is non-reactive with the amorphous silicon carbide employed in the smoothing layer. Examples of suitable non-oxide ceramic materials are silicon carbide, silicon nitride, silicon, aluminum nitride, boron carbide, titanium diboride, and mixtures thereof. Preferred ceramics are pressureless sintered silicon carbide and aluminum nitride. If the ceramic base is comprised of silicon carbide, it can be of the α- or β-crystal types, or a mixture thereof. Of these silicon carbides, α-silicon carbide is more preferred due to the relatively low cost for its manufacture.

Preparation of the above-described non-oxide ceramic materials is generally well known in the ceramic arts and such materials are available commercially. Such non-oxide ceramics can be formed by any conventional method, such as, forming a raw batch mixture comprising the desired ceramic in powder form and a sintering aid, forming the raw batch mixture into an unsintered green body, and then densifying the green body by conventional pressureless sintering, reaction bonding, chemical vapor deposition, hot pressing, or melt processing methods. Before densification, the raw batch compositions can be formed into a green body by tape casting, dry-pressing, extrusion, or other known methods for making ceramic bodies and then densified to final form. A preferred method for forming the green body is tape casting, since it is believed that this method provides a densified ceramic surface that, in many instances, is sufficiently smooth so as to be directly coated with the smoothing layer without prior grinding or polishing.

Preparation of preferred pressureless sintered silicon carbides is described in U.S. Pat. Nos. 4,312,954 and 4,179,299, the teachings of which are incorporated herein by reference. Generally, such silicon carbides are prepared from a raw batch mixture comprising particulate silicon carbide, a sintering aid such as boron or aluminum, a source of amorphous carbon, a binder which can be an organic resin, and various dispersants, lubricants, solvents or diluents. This raw batch may be formed into a green body by one of the above-recited methods, and finally, sintered in the absence of added pressure and at a temperature of from about 1900° to about 2500° C. for at least about 20 minutes.

Where silicon carbide is employed as the ceramic base, it may optionally contain minor amounts of other compounds which can affect the surface quality and mechanical properties thereof, such as fracture toughness, to improve machineability of the ceramic. Compounds which can be employed for this purpose are silicon, silicon-containing compounds like $MoSi_2$ and $TiSi_2$, aluminum, aluminum-containing compounds like AlN, boron nitride, carbon, and metal oxides. Typically, these compounds are added in an amount of up to about 5 weight percent based on the weight of the sintered silicon carbide.

Preferred aluminum nitrides have a thermal conductivity of at least about 100 watt/m°K., since this reduces temperature gradients (and thermally-induced stress) within the storage components during their manufacture and use. The aluminum nitride ceramic desirably comprises at least about 70 volume percent, preferably at least about 90 volume percent aluminum nitride with the balance being additives, such as sintering aids and compounds which modify the physical and/or chemical properties of the aluminum nitride. Sintering aids for aluminum nitride typically include greater than 0 and up to about 5 weight percent, based on the starting mixture, of oxides of rare earth elements, such as yttria; fluorides of rare earth elements, such as yttrium fluoride; oxides of alkaline earth elements, such as calcium oxide; carbides of alkaline earth elements, such as calcium carbide; and fluorides of alkaline earth elements, such as calcium fluoride.

Refractory metals, such as molybdenum, tungsten, and mixtures thereof and, alternatively, compounds containing molybdenum and/or tungsten, such as oxides, carbides, fluorides, and mixtures thereof, can be optionally added to the aluminum nitride/sintering aid mixture. These additives lead to formation of metallic particles in the sintered body and are believed to improve the toughness and shock resistance of the aluminum nitride.

After the ceramic is formed and densified, it can be machined, if necessary, into a desired final shape. Also the non-oxide ceramic may be polished to improve the surface finish thereof using commercially available grinding and lapping equipment, as described more fully in the following examples.

The non-oxide ceramic base is suitably densified to at least about 90 percent of theoretical density. Preferably, the non-oxide ceramic is densified to at least about 93 percent of theoretical density and more preferably to at least about 96 percent. Percent theoretical density is a well-known parameter in the art and, for a given ceramic composition, it may be readily determined using the Law of Mixtures. In general, a high degree of densification is preferred, as the resulting ceramic will have a reduced amount of surface roughness created by surface porosity in the ceramic. Preferably, the non-oxide ceramic has substantially no surface porosity, i.e., pits, greater than about 2 microns in diameter.

The non-oxide ceramic should also have a coefficient of thermal expansion which is matched to that of the non-stoichiometric silicon carbide smoothing layer described hereinafter. Matching of the coefficient assists with obtaining a good bond between the ceramic base and smoothing layer, as well as reducing mechanical stress therein. Suitable non-oxide ceramics have a coefficient of thermal expansion of from about 2 to about 7 ppm/°C., and preferably from about 3 to about 6 ppm/°C.

The non-oxide ceramic base has at least one surface which contacts the smoothing layer described in detail hereinafter. Preferably, the non-oxide ceramic has a surface roughness of less than about 2000 Å Ra, and more preferably less than about 1000 Å Ra. Surface roughness can be measured by known optical or contact methods, such as by use of a stylus profilometer. Surface roughness (Ra) values reported herein are determined using a Dektak IIA profilometer available commercially from Sloan Technology Corporation of Santa Barbara, Calif., U.S.A. This profilometer is equipped with a 12.5 micron (μm) radius diamond stylus and uses a tracking force of 50 milligrams. The Dektak IIA profilometer can determine surface roughness in the range of from about 5 Å to about 100,000 Å.

The ceramic base may have a thickness which can vary widely, but it is preferred that the thickness be as small as possible due to weight and space considerations associated with magnetic storage components. On the other hand, the thickness must be sufficient for the non-oxide ceramic to retain its rigidity and shape in subsequent processing steps and during use. For the preferred annular disk shape associated with storage media, a preferred thickness is from about 0.005 to about 0.2 cm, and more preferably from about 0.01 to about 0.10 cm.

An important element of the substrate according to the invention is the smoothing layer which contacts the non-oxide ceramic base. It has been found that the above-described non-oxide ceramics, when coated with a substantially amorphous layer of non-stoichiometric silicon carbide, provides a strong, tough, and chemically resistant surface which can be polished to a very smooth finish and is therefore advantageous for placing a magnetic layer or layers in preparation of magnetic storage media. Further, as described hereinafter, this substrate is advantageously employed to encapsulate magnetic circuits used in making thin-film magnetic heads.

As used herein, the term "substantially amorphous" means that the silicon carbide is at least about 50 percent (by weight) amorphous, preferably at least about 80 percent, and most preferably at least about 95 percent amorphous, as determined by x-ray diffraction analysis.

Figure 3:
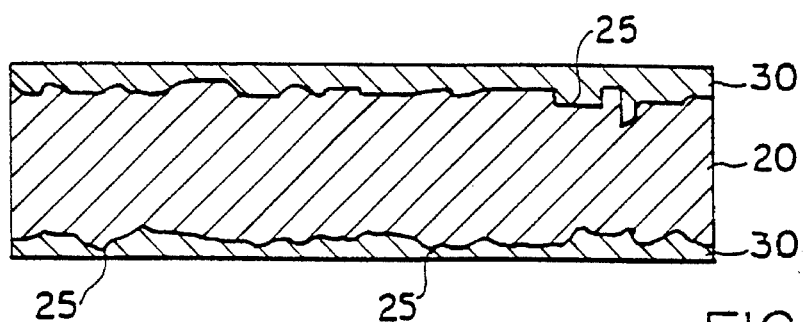
FIG. 3 is an enlarged section view of an embodiment of a substrate comprising a flat shaped non-oxide ceramic core with a smoothing layer coated on both sides thereof.

Referring now to FIG. 3 which depicts a substrate according to the invention, the non-oxide ceramic base 20 is shown coated with a smoothing layer 30 comprised of a substantially amorphous non-stoichiometric silicon carbide. As shown in the figure, surface irregularities 25 (shown generally) on the ceramic base, i.e., the "peaks" and "valleys" previously discussed herein, are covered by deposition of the amorphous silicon carbide on the non-oxide ceramic surface. The amorphous silicon carbide may then be polished to a fine surface finish of less than about 100, preferably less than about 25, more preferably less than about 10 Å Ra.

The substantially amorphous silicon carbide layer is non-stoichiometric in nature and comprises the formula $SiC_x$ wherein x, the molar ratio of carbon to silicon, is greater than 1. Preferably x is from about 1.1 to less than about 1.45 and more preferably from about 1.1 to about 1.2. Also, the layer may further comprise dopants, such as boron, which assist with formation of the silicon carbide layer by the preferred DC magnetron sputtering method described hereinafter.

The smoothing layer may be formed by any known method suitable for deposition of thin films on a substrate. Examples of such methods are chemical vapor deposition, evaporation, ion sputtering, RF sputtering, and DC magnetron sputtering. The smoothing layer is desirably deposited so as to be nearly defect-free and stress-free when applied to the ceramic.

The most preferred method for forming the smoothing layer is by DC magnetron sputtering, wherein a thin film of such amorphous silicon carbide may be deposited using a target composed of crystalline, non-stoichiometric silicon carbide. DC magnetron sputtering is a known process wherein a magnetic field is oriented perpendicular to a DC electric field. In general, the sputtering is conducted in a chamber containing a gas, typically argon, under reduced pressure. A plasma of projectile ions, such as Ar+ ions, is created within the chamber by applying a voltage across the gas in the chamber or by use of other known means, such as a commercially available sputter gun. The ions are accelerated in the electric field toward a "target", and upon contact, the momentum of the projectile ions is transferred to the target, thereby dislodging molecules from the target surface. The dislodged molecules are then deposited on a desired substrate in a line of sight from the target.

Suitable silicon carbides which can be used as a target in the practice of this invention are disclosed in U.S. Pat. No. 4,525,461, the teachings of which are incorporated herein by reference. The '461 patent discloses sintered silicon carbide bodies comprised of silicon carbide in combination with about 1–48 weight percent graphite, with about 1.5–49 weight percent total uncombined carbon, i.e., carbon which is not combined with silicon, such as graphitic and amorphous carbon. The silicon carbides also contain a sintering aid residue, i.e., boron, of from about 0.15–5.0 weight percent of the ceramic body. The balance of the body comprises silicon carbide. Such silicon carbides are available commercially from The Carborundum Company in Niagara Falls, N.Y., USA, the assignee of the present invention, which markets them generally as HEXOLOY® SG silicon carbide.

Copending application 08/184,517 filed Jan. 21, 1994, also assigned to The Carborundum Company, discloses preferred sputter targets of non-stoichiometric silicon carbide which can be used to obtain preferred non-stoichiometric silicon carbide smoothing layers, i.e., those having an x value of from about 1.1 to less than about 1.45. Such targets can be DC magnetron sputtered at very high rates of deposition. These preferred targets are discussed more fully hereinafter.

It should be understood that the composition of the desired smoothing layer will essentially correspond to the composition of the target, i.e., the molar ratio x will be essentially the same. However, sputtering essentially converts graphitic carbon to the amorphous form, so carbon in the sputtered silicon carbide will be substantially amorphous in nature.

As described in U.S. Pat. No. 4,525,461, suitable non-stoichiometric silicon carbide targets can be prepared in general by forming a raw batch mixture comprising particulate silicon carbide; graphite particles; a sintering aid such as boron, aluminum, beryllium, and mixtures thereof; a source of amorphous carbon; a binder which can be an organic resin; and various dispersants, lubricants, solvents or diluents. This raw batch may be formed into a green body by one of the forming methods described hereinabove, and then sintered without added pressure and at a temperature of from about 1900° to about 2500° C. for at least about 20 minutes to yield a suitable sintered target material. Other methods for preparing non-stoichiometric silicon carbide are also known, such as hot pressing.

The sputter target is electrically conductive with a resistivity of desirably less than about 10 Ω-cm, and in the case of the preferred targets, a resistivity of no greater than about 2 Ω-cm and more preferably less than about 0.1 Ω-cm. A resistivity greater than about 10 Ω-cm is less desired, since it may be difficult to sputter the silicon carbide at a sufficiently high deposition rate.

Resistivities of less than about 10 Ω-cm can be obtained by increasing the density of the sintered silicon carbide/carbon target to a point close to its theoretical density and also increasing the amount of carbon therein. Resistivities less than about 10 Ω-cm can also be obtained at relatively low carbon levels by adjusting the amount of sintering aid employed and/or adding dopants, like boron, phosphorous, nitrogen, aluminum and mixtures thereof, to the raw batch and/or the sintering atmosphere so as to cause the silicon carbide target to become doped. Such doping increases the free carrier density of the sintered body. In general, adding a dopant in an amount sufficient to result in about $1 \times 10^{17}$ to about $1 \times 10^{19}$ atoms/cm$^3$ of dopant in the target is sufficient to advantageously increase the free carrier density. It is also preferred to sinter the target in an atmosphere composed of a noble gas like argon, since this is believed to minimize any decrease in electrical conductivity (and associated sputtering rate) of the target.

The density of the silicon carbide target is preferably at least about 90 percent of theoretical density (corresponding to a density of approximately 2.89 g/cm$^3$) for its composition, based on the Law of Mixtures and assuming zero porosity. It is more preferred, however, that the density be at least about 95 percent of theoretical density, which corresponds to a density of approximately 3.05 g/cm$^3$, and most preferably, as close as possible to theoretical density. The target density affects the thermal conductivity of the target and rate at which sputtering can be conducted. In general, deposition rates increase as the target density is increased.

The raw batch employed for making the preferred targets wherein x is from about 1.1 to less than about 1.45 includes a $SiC_x$ mixture of from about 88.1 to about 97 weight percent silicon carbide particles and from about 3.0 to about 11.9 weight percent uncombined carbon selected from graphite, amorphous carbon, and mixtures thereof. Where x is from about 1.1 to about 1.20, the raw batch will include an $SiC_x$ mixture of from about 94.35 to about 97 weight percent silicon carbide and from about 3.0 to about 5.65 weight percent uncombined carbon.

The $SiC_x$ mixture described above will generally comprise from about 60 to about 75 weight percent of the raw batch. A carbonizable organic compound, such as a phenolic resin, is generally added to the raw batch so that upon sintering it decomposes to form carbon. The silicon carbide and graphite employed in the raw batch are normally obtained in the form of a finely divided particulate and can be obtained commercially. These materials are described at length in U.S. Pat. No. 4,525,461 previously incorporated by reference.

Also added to the raw batch is up to 25 weight percent of a temporary binder component which can comprise organic resins, solvents, diluents, lubricants and other processing aids. The temporary binder can also contribute to the amount of carbon present in the sintered body and must be considered when determining the proportions of raw materials to obtain a desired value of x. A sintering aid, such as elemental or combined boron, aluminum, or beryllium is also generally added in an amount of from about 0.15 to about 15 weight percent of the raw batch. All of the above-described components are described at length in U.S. Pat. No. 4,525,461 previously incorporated by reference.

The smoothing layer is deposited onto the non-oxide ceramic core to a thickness which is sufficient to cover surface irregularities thereon and that can be subsequently polished to a fine surface finish. Generally, a suitable thickness is from about 1 to about 50 microns, with about 20 microns or less being preferred where the substrate is used in making magnetic storage media in order to minimize cost.

If desired, the substrate previously described may be adapted into a magnetic storage medium by depositing thereon a magnetic layer which is of a material capable of magnetically storing data. The magnetic layer may be directly formed on top of the outer surface of the smoothing layer, but, preferably, an optional transition layer is first formed on the smoothing layer to improve bonding of the magnetic layer to the underlying substrate.

The transition layer preferably comprises a metal selected from chromium, vanadium, tantalum, molybdenum, and mixtures thereof. Most preferably, the transition layer is comprised of chromium due to its chemical compatibility with most materials used in forming magnetic layers. The transition layer suitably has a thickness which is sufficient to cover the coated substrate. Generally, a thickness of from about 2,000 to about 20,000 Å is adequate, preferably from about 5,000 to about 10,000 Å. The transition layer may also be formed by any of the deposition methods, as previously described, for depositing the amorphous silicon carbide smoothing layer.

Suitable materials which may be used to form the magnetic layer are known. Generally, any magnetic material or metal which is capable of magnetically storing data is suitable. Typically, the magnetic layer is cobalt, iron, or a mixture of the two, in which other elements are optionally added to improve performance, such as chromium, nickel, platinum, tantalum, boron, and silicon. The magnetic layer has a thickness of desirably from about 100 to about 2500 Å, and preferably from about 100 to about 500 Å. Methods to form the magnetic layer include DC magnetron sputtering, evaporation and chemical vapor deposition.

Optionally, the magnetic storage medium may have at least one protective layer which is coated on top of the magnetic layer to provide protection from contact with the head. Suitable materials for the protective layer are also known and include an amorphous inorganic oxide, such as that disclosed in U.S. Pat. No. 4,069,360, the relevant teachings of which are incorporated herein by reference. Also suitable are thin films of metals, such as rhodium, chromium, platinum, and ruthenium, as well as boron nitride, carbon, and silicon carbide, such as the non-stoichiometric silicon carbides previously described herein which can be advantageously sputtered onto the disk. Carbon is presently widely employed as a protective material for conventional aluminum-NiP magnetic storage media and is desirable due to its non-magnetic characteristic and an ability to be readily sputtered onto a substrate.

A thin film of lubricant, such as DuPont 804 lubricant available from the E.I. DuPont de Nemours & Company of Wilmington, Del., U.S.A., may also be optionally coated on top of the materials previously mentioned as an additional protective layer. Such lubricants assist with reducing friction between the magnetic storage medium and the head.

The thickness of the above described protective layer, or layers, is generally less than about 1000 Å, and preferably less than about 500 Å.

Preparation of conventional thin-film heads is described in detail in the article by Bond, previously mentioned herein. In general, metal coils which function as a transducer are formed on an alumina-titanium carbide substrate by known photolithographic methods which include deposition of metals, as well as masking and selective etching thereof. After formation, the coils are encapsulated with a sputtered film of alumina. The resulting substrate is sliced into thin strips which are further processed so as to render them aerodynamic and thereby facilitate movement of the finished head above a rapidly rotating media disk.

Difficulties in preparing such heads, such as machining difficulties; stress in the encapsulating alumina material; and long times required to form the encapsulating alumina layer, may be reduced by using the non-oxide ceramic base previously described and encapsulating the coils with the non-stoichiometric silicon carbide smoothing layer previously described herein.

Figure 4:
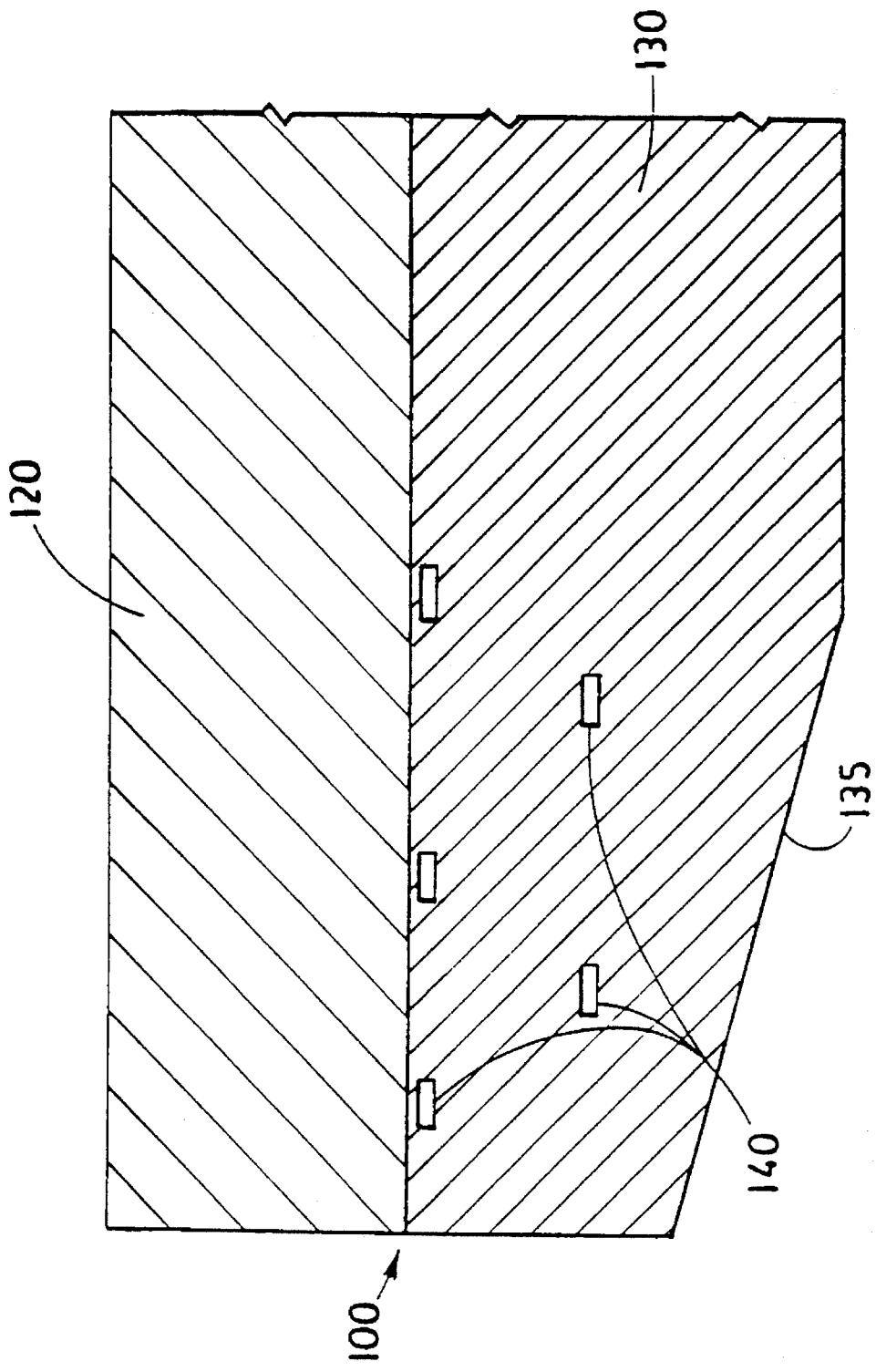
FIG. 4 is a simplified, section view of an embodiment of a thin-film head.

Referring now to FIG. 4, a thin-film head 100 (generally) according to the invention is shown. A non-oxide ceramic base substrate 120, corresponding generally to the description previously mentioned herein, is shown with metal coils 140 which can be formed on the base substrate according to the known photolithographic methods. The coils 140 may be either an inductive (read/write) type or magnetoresistive (read only) type, or a combination of both. The coils 140 are encapsulated by an amorphous smoothing layer 130, comprised of the non-stoichiometric silicon carbide previously described herein. The amorphous silicon carbide may be formed by the methods and to a thickness also as previously described herein. The resulting substrate may be cut into a desired shape and the amorphous silicon carbide polished to a fine surface finish as described hereinabove. A polished surface 135 as shown in FIG. 4 is typically the surface that floats above a magnetic storage medium to read/write data thereon.

Other embodiments of the thin-film head will become apparent to those skilled in the art.

Specific Embodiments

The following examples are intended to illustrate the invention and should not be construed, by implication or otherwise, as limiting the scope of the appended claims.

EXAMPLE 1

Preparation of Substrates Useful in Magnetic Data Storage Components

A non-oxide ceramic base of sintered silicon carbide is provided measuring 3 centimeters (cm) long, 3 cm wide, and 0.10 cm thick. The base substrate is machined from HEXOLOY® SA silicon carbide available from The Carborundum Company located in Niagara Falls, N.Y., USA which is formed into a green body by tape casting prior to sintering. The silicon carbide has a density of 3.1 g/cm$^3$, or 98 percent of theoretical density. The silicon carbide also has a coefficient of thermal expansion of 3.8 ppm/°C.

The surfaces of the base substrate are first polished using a Planopol-V polisher available from Struers Company. The substrate is loaded onto the polisher and polished initially with a polishing disk using a slurry consisting of water and a diamond powder having an average particle size of 6 microns for 20 minutes. Thereafter, the substrate is polished for an additional 30 minutes using a slurry wherein the diamond powder has an average particle size of 1 micron. Finally, the substrate is polished for an additional 10 minutes with a slurry wherein the diamond powder has an average particle size of 0.1 micron.

Between each of the above-described polishing steps, the substrate is cleaned with a detergent and rinsed with deionized water. After polishing, the substrate is cleaned again, rinsed a final time with deionized water, and allowed to dry in air. Prior to coating with substantially amorphous non-stoichiometric silicon carbide, the surface roughness of the ceramic base is determined using the Dektak II profilometer previously described. The surface roughness is 547 Å Ra.

The ceramic base is coated by DC magnetron sputtering with a smoothing layer of substantially amorphous non-stoichiometric silicon carbide. The equipment used to sputter the coating consists of a vacuum chamber which can be evacuated to a pressure of about $5 \times 10^{-5}$ torr or less by use of a cryopump. The chamber is equipped with three sputter guns, each of which has a cathode available commercially as a SunSource Planar Magnetron Cathode from Materials Science Company in San Diego, Calif., U.S.A. The chamber is also equipped with a quartz lamp and a mechanical rotation means to which the substrates may be attached and rotated at an even rate above the cathodes. During use, argon gas is fed into the chamber. The pressure within the chamber is maintained at $1 \times 10^{-3}$ to $7 \times 10^{-3}$ torr.

A sputter target of HEXOLOY® SG silicon carbide available from The Carborundum Company is used to form the amorphous smoothing layer and is attached to a cathode. The HEXOLOY® SG silicon carbide target is a silicon carbide/graphite/amorphous carbon composite wherein the x value (from the formula SiC$_x$) is 1.3. The target contains 4 weight percent boron as residue from the sintering aid employed to make the target, which functions as a dopant to promote sputtering. The target has a density of 3.04 g/cm$^3$, or 96 percent of theoretical density.

The non-oxide ceramic base substrate is attached to the rotating means directly above the cathodes. The chamber is evacuated and the substrate initially heated to a temperature of 200° C. by use of the quartz lamp. Thereafter, the lamp is turned off. Sputtering is conducted at a power input to the cathode of 15 watts/cm$^2$ for 30 minutes which is sufficient to deposit a smoothing layer of 10 microns in thickness. The overall deposition rate is 50 Å/sec.

The resulting coated substrate is polished to a fine surface finish using the Planopol-V polisher. The coated substrate is loaded onto the polisher and polished initially with a disk using an aqueous slurry containing a diamond powder of 1 micron average particle size for 10 minutes. Thereafter, the substrate is polished for an additional 20 minutes with a slurry of 0.1 micron average size diamond powder. Between the polishing steps, the substrate is cleaned with a detergent and rinsed with deionized water.

After polishing, the substrate is cleaned again, rinsed a final time with deionized water, and allowed to dry in air. The surface finish of the substrate is measured using the Dektak II profilometer previously described. The surface roughness is 14 Å Ra.

EXAMPLE 2

The procedure of Example 1 is substantially repeated, except where indicated hereinafter.

The non-oxide ceramic base employed is tape cast aluminum nitride prepared from an intitial raw batch mixture containing 3 weight percent Y$_2$O$_3$ based on the mixture weight. The aluminum nitride has a density of 3.3 g/cm$^3$ (100% of theoretical density), a thermal conductivity of 170 W/m°K. and a coefficient of thermal expansion of 4.2 ppm/°C. After polishing, the aluminum nitride base substrate has a surface roughness of 334 Å Ra.

Sputtering of an amorphous silicon carbide smoothing layer wherein x in the formula SiC$_x$ has a value of 1.14 is conducted with a sputter target prepared as follows. To 100 grams of finely divided silicon carbide particles in a Sweco mill are added 0.7 gram of $B_4C$ and sufficient water to facilitate mixing. This mixture is milled until the silicon carbide particles have an average size of 0.5 micron and a surface area of 6–8 $m^2$/gram. Thereafter, 6.0 grams of submicron amorphous carbon ("Raven 1255" carbon black from Columbian Chemicals Company) and 1.9 grams dispersant ("Arlacel 83R" from ICI) are added to the mill and the resulting mixture is milled for approximately 4 hours.

The water is drained from the mill and the following binder components are added and mixed therein: 0.2 gram trimethylamine; 2.9 grams polyvinylalcohol resin ("Airvol 603" from Air Products and Chemicals, Inc.); 3.8 grams acrylic resin emulsion ("Rhoplex HA-8" from Rohm & Haas); and 2.16 grams of phenolic resin ("Plyophen 43290" from Occidental Chemical Company). The resulting mixture is then spray dried to obtain a raw batch particulate mixture wherein 45 weight percent of the particles have a size of greater than 200 mesh and 55 weight percent have a size less than 200 mesh.

The spray-dried mixture is isostatically pressed at room temperature under 17,000 psi into a cylindrical green body 16 inches long and 4 inches in diameter. The green body is cured at 160° C. for 12 hours and then machined to a cylinder 3.0 inches in diameter. A disk about 0.375 inch thick is sliced from the machined cylinder.

The remaining binder components in the disk are decomposed and the disk sintered in one step by heating the disk under an inert argon atmosphere to 2150° C. and holding this temperature for one hour. The disk is then cooled to room temperature. The resulting sintered disk is recovered and exhibits a density of 2.95 g/$cm^3$ (92 percent of theoretical density) and a resistivity of 1–2 ohm-cm. The disk is then machined under deionized water to a thickness of 0.250 inch and extracted with deionized water for 48 hours. The disk is then heated to 600° C. under argon and allowed to cool to room temperature. The carbon content of the finished target is 3.9 weight percent, corresponding to an "x" value of 1.14 in the formula $SiC_x$.

The above-described target is then sputtered in the chamber at a power input of 15 watts/$cm^2$ for 70 minutes, which is sufficient to deposit an amorphous silicon carbide layer of 22 microns in thickness on the aluminum nitride base substrate. The overall deposition rate is 50 Å/sec. A significantly higher deposition rate is obtained by increasing the power input to about 50 watts $cm^2$.

After polishing, as in Example 1, the surface finish of the finished substrate is determined to be 14 Å Ra. The amorphous silicon carbide smoothing layer has good adherence to the aluminum nitride.

EXAMPLE 3

Preparation of a Magnetic Storage Medium

The substrate prepared according to Example 1 is used to prepare a magnetic storage medium. After polishing the amorphous silicon carbide surface as in Example 1, the substrate is again placed onto the rotating means within the vacuum chamber. The three cathodes in the chamber are equipped respectively with a target of chromium metal obtained from Cerac, Inc. of Milwaukee, Wis., U.S.A., a target of a magnetic metal alloy consisting of $Co_{0.80}Cr_{0.10}Pt_{0.05}Ta_{0.05}$ (expressed in terms of atomic fractions) also obtained from Cerac, and a target of the non-stoichiometric silicon carbide described in Example 2.

The chamber is operated substantially as in Example 1, except that it is first heated to a temperature of 700° C. which is maintained for 10 minutes. Thereafter, the cathode having the chromium target is used to sputter a transition layer of chromium metal onto the substrate. The power input to the cathode is 10 watts/$cm^2$ for 20 minutes, which is sufficient to form a layer of chromium metal approximately 1 micron thick. Sputtering is then discontinued.

Thereafter, the cathode having the cobalt-chromium metal alloy target is used to deposit a magnetic metal layer onto the substrate, the magnetic layer formed corresponding essentially to the composition of the target, i.e., $Co_{0.80}Cr_{0.10}Pt_{0.05}Ta_{0.05}$. The power input to the cathode is 15 watts/$cm^2$ for 30 seconds, which is sufficient to deposit a magnetic layer 200 Å thick. Sputtering is then discontinued.

The cathode having the non-stoichiometric silicon carbide target is then used to deposit a silicon carbide/carbon protective layer on top of the magnetic layer, the protective layer essentially corresponding to the composition of the target. The power input to the cathode is 10 watts/$cm^2$ for 10 seconds which is sufficient to deposit a layer having a thickness of 50 Å.

After deposition of the above-described layers, the resulting layered substrate is capable of being used as a magnetic storage medium.

The surface roughness of the resulting final product is then determined according to the procedure of Example 1. The surface roughness is determined to be 12 Å Ra. The surface roughness of the final product essentially corresponds to that of the smoothing layer in Example 1, thereby indicating that deposition of the additional layers does not substantially alter surface roughness.

Adhesion of the above-described multi-layered coating to the ceramic base is evaluated by a "peel" technique. A wire is soldered to the above-described multi-layered substrate through use of a 0.1 mm by 0.1 mm pad of solder. The force required to peel the wire from the pad is then determined. The force required to peel the wire from the substrate is determined to be at least 10 pounds (44.5N), thereby indicating that the multi-layer coating is strongly adherent to the ceramic base.

EXAMPLES 4–9

Preparation Of Thin-Film Magnetic Heads

A thin-film head is prepared in Examples 4–9 using the HEXOLOY® SA silicon carbide base substrate employed in Example 1. The procedure followed in each example is substantially the same as Example 1, except as noted hereinafter. Also, the sputtering pressure used to deposit amorphous silicon carbide for encapsulating a metal coil is varied in each example to determine the affect on stress in the resulting film.

Simulated coils consisting of aluminum metal strips measuring 1 millimeter wide and 1 micron thick are formed on each of six silicon carbide substrates having dimensions as indicated in Example 1. Before depositing the aluminum, the substrates are polished as in Example 1 to a surface roughness of 400 Å Ra. The coils are formed by masking one side of the base substrate to form exposed strips of silicon carbide surface 1 millimeter wide. Aluminum is then sputtered onto the exposed surfaces using the chamber described in Example 1 and a target of aluminum.

Thereafter, the resulting coils on each of the substrates are encapsulated with a layer of amorphous, non-stoichiometric silicon carbide by DC magnetron sputtering substantially according to the procedure followed in Example 2, except that the argon gas pressure during sputtering is adjusted to the levels shown in Table I. The non-stoichiometric silicon carbide target described in Example 2 is also used. The temperature of the substrate during sputtering is maintained at approximately 100° C. The deposition time is three hours for each sample, which is sufficient to deposit a layer 30 microns thick.

After sputtering, the stress of the sputtered silicon carbide film is determined. Stress is determined by measuring the curvature of the substrate using the Dektak II profilometer and using the resulting curvature values in the following formula:

$$T = \frac{E_s t_s^2}{6(1-v_s)t_f} \left( \frac{1}{R} - \frac{1}{R_o} \right)$$

where:

T is the stress in Pascals (Pa);

$E_s$ is the Young's modulus of the base substrate in Pa;

$v_s$ is the Poisson ratio of the base substrate;

$t_s$ is the thickness of the base substrate in μm;

$t_f$ is the thickness of the sputtered silicon carbide film in μm;

$R_o$ is the curvature in μm of the base substrate before sputtering; and

R is the curvature in μm of the base substrate after sputtering.

The stress values determined in each example are shown in Table I wherein a "−" sign represents a compressive stress and a "+" represents a tensile stress.

TABLE I

Data for Examples 4–9

| Example No. | Sputtering Pressure ($\times 10^{-3}$ torr) | Stress ($\times 10^6$ Pa) | Surface Roughness (Å Ra) |
|---|---|---|---|
| 4 | 1.5 | −0.87 | 14 |
| 5 | 5.0 | −0.81 | 11 |
| 6 | 6.6 | +0.09 | 11 |
| 7 | 7.5 | +0.16 | 18 |
| 8 | 10.0 | +0.07 | 18 |
| 9 | 15.0 | +0.02 | >50 |

The amorphous silicon carbide layer is then polished to a fine surface finish and the surface roughness determined substantially according to the procedure described in Example 1. The surface roughness values determined for each example are shown in Table I. The electrical resistance of the coils is also determined before and after sputtering. In each example, there is no change in electrical resistance due to the presence of the sputtered silicon carbide layer.

The results for Examples 4–9 show that the pressure at which the non-stoichiometric silicon carbide is sputtered has an affect on the stress and surface finish of the resulting silicon carbide film. For the specific sputter chamber employed in Examples 4–9, a sputtering pressure of about $6 \times 10^{-3}$ torr yields an essentially unstressed (no compressive or tensile stress) and smooth surface. The optimum sputtering pressure for another sputtering chamber may be different, and therefore, must be determined empirically for the specific equipment employed.

Similar results are obtained from other embodiments of the invention as previously described herein.

What is claimed is:

1. A substrate comprising a non-oxide ceramic base and a substantially amorphous smoothing layer comprised of silicon carbide corresponding to the formula $SiC_x$ wherein x is the molar ratio of carbon to silicon and is greater than 1, the non-oxide ceramic having a density of at least about 90 percent of theoretical density and a coefficient of thermal expansion of from about 2 to about 7 ppm/°C., the smoothing layer having an inner surface contacting at least one surface of the ceramic base and an outer surface with a surface roughness of about 25 Å Ra or less.

2. The substrate of claim 1 wherein x is from about 1.1 to less than about 1.45.

3. The substrate of claim 1 wherein the outer surface of the smoothing layer has a surface roughness of less than about 10 Å Ra.

4. The substrate of claim 1 wherein the smoothing layer has a thickness of from about 1 to about 50 μm.

5. The substrate of claim 1 wherein the smoothing layer has a thickness of from about 1 to about 20 μm.

6. The substrate of claim 1 wherein the non-oxide ceramic is selected from the group consisting of silicon carbide, silicon, silicon nitride, boron carbide, titanium diboride, aluminum nitride, and mixtures thereof.

7. The substrate of claim 1 wherein the non-oxide ceramic is a material densified to at least about 96 percent of theoretical density.

* * * * *